UNITED STATES PATENT OFFICE 2,645,662

MANUFACTURE OF DIPHENYLAMINE

Robert H. Nimmo, Pittsburgh, Pa., assignor to Koppers Company, Inc., Pittsburgh, Pa., a corporation of Delaware No Drawing. Application July 25, 1947, Serial No. 763,749

11 Claims. (Cl. 260—576)

This invention relates to chemical processes and is directed particularly to the manufacture of diarylamines specifically diphenylamine.

This application is in part a continuation of my copending application Serial No. 610,877, filed August 14, 1945, now abandoned.

Diarylamines are produced among other ways by deammoniating the corresponding arylamine under the catalytic activation of a suitable deammoniating catalyst. Various deammoniating catalysts are known in the art to effect the reaction at a suitable high velocity and suitably high yields. It is known, for example, that zinc chloride in combination with ammonium chloride will effectively deammoniate aniline at an effective rate and in relatively high yields (Giornale di Chemica Applicata 1, 15–22 (1920)). It is also known that ferrous chloride in combination with ammonium chloride or aniline hydrochloride will effect the deammoniation of aniline at a comparable rate and with a comparable yield. (U. S. P. 2,120,968.)

It has also been proposed to use aluminum chloride as the catalyst in such deammoniation reactions. See, for example, Bezzubets et al.— Org. Chem. Ind. (U. S. S. R.) 4 No. 13, 28–30 (1937), (C. A. 31, 8521 (1937)). The known procedure, however, is inefficient and, moreover, requires an excessively large proportion of aniline hydrochloride in order to obtain effective deammoniation of the aniline.

The objects of the present invention are to provide new and useful processes for deammoniation of aniline in the presence of aluminum chloride. A particular object of the invention is to provide processes in which relatively high proportions of aniline to aniline hydrochloride may be employed. Still more particular objects are to increase the overall efficiency of the process. Further objects are to avoid disadvantages of the prior art and to obtain advantages as will be more particularly pointed out hereinafter. Other objects will appear as the description proceeds.

These objects are accomplished in the present invention by subjecting the liquid aniline to the action of a catalyst comprising aluminum halide and aniline hydrohalide in the proportions of at least 3 mols of aniline hydrohalide for each mol of aluminum halide and from about 5 to about 15 parts of aniline for each part of aniline hydrochloride at a temperature between about 275° C. and about 350° C. and at a pressure sufficient to maintain the aniline in the liquid state.

In accordance with the processes of the invention the deammoniation is carried out at a temperature between about 275° C. and about 350° C. while maintaining a pressure sufficient to keep the aniline in the liquid state. I have found that operation within this temperature range is critical to obtaining optimum conversions and yields. Desirably, the temperature is maintained by means of a gentle reflux of aniline over the liquid reaction mixture. The pressure builds up autogenously due to the liberation of ammonia and may be regulated as required to keep the desired state of reflux, by periodically or continuously bleeding off ammonia.

The catalyst utilized in the processes of the invention is basically a mixture (chemical or physical) of aluminum halide and aniline hydrohalide. These two constituents are believed to enter into complex combination in the proportions of 3 mols of aniline hydrohalide for each mol of aluminum halide. Any excess of aluminum halide over this is not only ineffective in producing the desired reaction, but tends to bring about the formation of tar and other undesirable by-products. Any excess of aniline hydrohalide tends only to complicate the recovery of aniline, aniline hydrohalide and diphenylamine from the reaction mixture. The proportions, therefore, should be not less than about 3 and not substantially greater than 3 parts of aniline hydrohalide for each part of aluminum halide. Suitably, the proportions may be from 3 to 4 parts of aniline hydrohalide for each part of aluminum halide.

One of the particular advantages which result from operation under the conditions above specified is that the amount of aniline in proportion to the amount of catalyst may be materially increased over that required in accordance with the prior art processes. This has the advantage of materially lowering the quantity of recycle required in the process and, furthermore, facilitates separation of aniline, aniline hydrohalide and diphenylamine in the reaction mixture. This applies both to separations by aqueous extraction and distillation. In aqueous extraction, according to the prior art, excessive quantities of aqueous solution of aniline hydrochloride must be worked up for its recovery, and in the case of distillation, the formation of an aniline hydrochloride-diphenylamine azeotrope greatly complicates the recovery of diphenylamine where the ratio of aniline to aniline hydrochloride is low.

In accordance with the processes of the invention it is possible to obtain effective conversions and high yields with as much as 15 parts of aniline for each part of aniline hydrohalide. Any smaller quantity may be used, though ordinarily no advantage obtains with less than about 5 parts of aniline for each part of aniline hydrochloride. In the practical operation of the process the aniline will be maintained as high as possible with respect to the aniline hydrohalide consistent with obtaining the desired high conversions and high yields. Ordinarily best results are obtained with proportions in the order of nine or ten parts of aniline for each part of aniline hydrohalide.

The aniline hydrohalide may be added as such or formed in situ from a suitable ammonium hydrohalide such as ammonium chloride. Any ammonium hydrohalide which, under the conditions of the reaction, is capable of liberating hydrohalide for the formation of aniline hydrohalide may be utilized.

The invention may be more fully understood by reference to the following examples in which the parts are by weight unless otherwise specified.

Example I

An autoclave is charged with 9,312 parts of aniline, 333 parts of aluminum chloride and 401 parts of ammonium chloride (mol ratio $AlCl_3/NH_4Cl = 1/3$).

During the first 65 minutes the temperature rose from 25° C. to 200° C., during the next 80 minutes from 200° C. to 300° C., and thereafter the temperature was maintained at 300° C. for five hours by intermittently releasing ammonia as required to maintain a gentle reflux action. The pressure during this period varied from 198 to 130 pounds per square inch gauge. From the reaction mixture there was recovered 4,959 parts diphenylamine. This is equivalent to 58.52% conversion and 94.73% yield.

In place of aluminum chloride there may be substituted other aluminum halides and in place of ammonium chloride there may be substituted aniline hydrohalide or other hydrohalides which, under the reaction conditions, form aniline hydrohalide.

Example II 9,310 parts of aniline consisting of 5,320 parts of make-up aniline and 3,990 parts of aniline recycled from the fractional distillation are combined with 333 parts of aluminum chloride, 971 parts of aniline hydrochloride and 937 parts of diphenylamine. The last two constitute an azeotropic mixture obtained as the intermediate fraction of the fractional distillation. The reaction mixture thus obtained is heated for five hours under a gentle reflux of aniline while maintaining the temperature of 300° C. by periodic release of ammonia. Over the reaction period, 425 lbs. of ammonia is recovered. The reaction mixture is now subjected to fractional distillation at 350 mm. mercury pressure. The first fraction boiling essentially at 155–155.5° C. consists essentially of aniline; 399 parts of aniline is thus recovered and recycled in the process. The intermediate fraction boils essentially at 215° C. It consists essentially of a constant boiling mixture of aniline hydrochloride and diphenylamine in the proportions of about 50.9% aniline hydrochloride and 49.1% diphenylamine. 2,126 parts of the intermediate fraction are taken overhead, of which 1,908 parts are recycled in the reaction to provide the requisite 971 parts of aniline hydrochloride. The remaining 218 parts is taken to storage. The third fraction boiling essentially at 265° C. consists essentially of diphenylamine. 3,426 parts are thus taken overhead. There remains in the still 1,740 parts residue. The excess aniline hydrochloride-diphenylamine azeotrope may be treated periodically or otherwise to separate diphenylamine and aniline hydrochloride. Suitably, the diphenylamine may be extracted by a suitable organic solvent such as benzene or toluene or equivalent boiling aliphatic hydrocarbons or other material such as pyridine, cyclohexane, carbontetrachloride and so forth or the aniline hydrochloride may be extracted with water.

While I have described my invention with reference to a particular embodiment thereof, it will be understood that variation may be made therein without departing from the spirit and scope of the invention.

The temperature is critical within limits of about 275° C. and about 350° C. At lower temperatures the reaction rate is extremely slow and the reaction does not take place to any appreciable extent unless excessive quantities of catalyst are used. At higher temperatures decomposition becomes excessive. Most satisfactory results are obtainable at temperatures in the order of about 300–325° C.

The pressure is critically determined as required to maintain the desired temperature. In other words, it must be sufficiently high to keep the aniline in the liquid state. The pressure therefore is allowed to build up under the autogenous pressure of the ammonia formed in the reaction and desirably is released as required to keep the reaction mixture substantially at the boiling point. In this manner the desired temperature is easily maintained by maintaining a gentle reflux action. Ordinarily the pressure will range between about 130 and 200 pounds per square inch gauge.

The proportion of aniline hydrohalide to aluminum halide is critical. If less than three mols of aniline hydrohalide per mol of aluminum halide is used, excessive formation of tar and heavy oils results. More than three mols of ammonium halide per mol of aluminum halide may be employed but generally the yield and percentage conversion are reduced. It is desirable, therefore, to maintain the proportions substantially at three mols of aniline hydrohalide per mol of aluminum halide within the limits of plus or minus $2/10$ of a mol. The proportions of aniline to aniline hydrochloride suitably may be between 5 and 15 parts aniline for each part aniline hydrohalide, though preferably in the order of 9 or 10 parts aniline for each part aniline hydrohalide.

While I have disclosed specifically the manufacture of diphenylamine, it is within the scope of the invention to produce other diarylamines by substituting in the process the corresponding arylamine. Thus there may be substituted for the aniline various primary arylamines such as anisidines, toluidines, xylidines, phenetidines, naphthylamines, and like compounds. In such substitution the active catalyst will, of course, be the corresponding hydrohalide-aluminum halide mixture.

I claim:

1. The process of producing diarylamine by deammoniating a primary aromatic amine which comprises subjecting a liquid primary aromatic amine to the combined action of aluminum halide and the hydrohalide of said primary aromatic amine in the proportions of at least three mols of said hydrohalide for each mol of aluminum halide and between about 5 and 15 parts of primary aromatic amine for each part of said hydrohalide at a temperature between about 275° C. and about 350° C. and at a pressure sufficient to maintain the primary aromatic amine in the liquid state.

2. The process of claim 1 in which the hydrohalide is added as such.

3. The process of claim 1 in which the hydrohalide is formed in situ from ammonium chloride.

4. The process of producing diphenylamine by deammoniating aniline which comprises subjecting liquid aniline to the combined action of aluminum halide and aniline hydrohalide in the proportions of at least three mols of aniline hydrohalide for each mol of aluminum halide and between about 5 and 15 parts of aniline for each part of aniline hydrohalide at a temperature between about 275° C. and about 350° C. and at a pressure sufficient to maintain the aniline in the liquid state.

5. The process of claim 4 in which the aniline hydrohalide is added as such.

6. The process of claim 4 in which the aniline hydrohalide is formed in situ from ammonium chloride.

7. The process of producing diphenylamine by deammoniating aniline which comprises subjecting liquid aniline to the combined action of aluminum chloride and aniline hydrochloride in the proportions of about 3 mols aniline hydrochloride for each mol of aluminum chloride and between about 5 and 15 parts of aniline for each part of aniline hydrochloride at a temperature between about 275° C. and about 350° C. and at a pressure sufficient to maintain the aniline in the liquid phase.

8. The process of claim 7 in which the aniline hydrohalide is added as such.

9. The process of claim 7 in which the aniline hydrochloride is formed in situ from ammonium chloride.

10. The process of claim 7 in which the proportions are about 40 mols of aniline and 3 mols of aniline hydrochloride for each mol of aluminum chloride.

11. The process of producing diphenylamine by deammoniating aniline which comprises subjecting liquid aniline to the combined action of aluminum chloride and ammonium chloride in the proportions of about 40 mols of aniline and 3 mols of ammonium chloride for each mol of aluminum chloride at a temperature of about 300° C. and at a pressure such that the reaction mixture is substantially at the boiling point, releasing ammonia as required to maintain said reaction mixture in a state of boiling, condensing the evolved vapors and returning the condensate to the reaction mixture.

ROBERT H. NIMMO.

References Cited in the file of this patent

UNITED STATES PATENTS

| Number | Name | Date |
| --- | --- | --- |
| 2,098,039 | Hill et al. | Nov. 2, 1937 |
| 2,133,825 | Meuser et al. | Oct. 18, 1938 |
| 2,514,430 | Webb et al. | July 11, 1950 |

FOREIGN PATENTS

| Number | Country | Date |
| --- | --- | --- |
| 697,421 | Germany | Oct. 14, 1940 |

OTHER REFERENCES

Degering, "Org. Nitrogen Cpds." (Univ. Litho., Ypsilanti, Michigan, 1945), 305–306.

Bezzubet et al., "Org. Chem. Ind." (U. S. S. R.), vol. 4, No. 13, pages 28–30 (1937).

Gershzon et al., "Org. Chem. Ind." (U. S. S. R.), vol. 4, No. 22, pp. 553–555 (1937).

Gershzon et al., "J. Applied Chem." (U. S. S. R.), vol. 9, pp. 502–504 (1935).

Gershzon et al.: "Chem. Ab.," vol. 30, pp. 7550–7551 (1936).